US012735545B2

(12) United States Patent
Hayashi et al.

(10) Patent No.: US 12,735,545 B2
(45) Date of Patent: Sep. 15, 2026

(54) POLYETHYLENE RESIN FOAMED PARTICLE, AND METHOD FOR PRODUCING SAME

(71) Applicant: JSP CORPORATION, Tokyo (JP)

(72) Inventors: Tatsuya Hayashi, Yokkaichi (JP); Akinobu Hira, Yokkaichi (JP)

(73) Assignee: JSP CORPORATION, Tokyo (JP)

( * ) Notice: Subject to any disclaimer, the term of this patent is extended or adjusted under 35 U.S.C. 154(b) by 185 days.

(21) Appl. No.: 18/549,026

(22) PCT Filed: Mar. 3, 2022

(86) PCT No.: PCT/JP2022/009096
§ 371 (c)(1),
(2) Date: Sep. 5, 2023

(87) PCT Pub. No.: WO2022/196372
PCT Pub. Date: Sep. 22, 2022

(65) Prior Publication Data

US 2024/0076464 A1 Mar. 7, 2024

(30) Foreign Application Priority Data

Mar. 15, 2021 (JP) ................................ 2021-041354

(51) Int. Cl.
*B29C 44/34* (2006.01)
*C08J 9/18* (2006.01)
(Continued)

(52) U.S. Cl.
CPC ............ *C08J 9/18* (2013.01); *B29C 44/3461* (2013.01); *B29K 2023/0625* (2013.01);
(Continued)

(58) Field of Classification Search
CPC .............................. C08J 9/18; B29C 44/3461
See application file for complete search history.

(56) References Cited

U.S. PATENT DOCUMENTS 4,778,829 A 10/1988 Ichimura et al.
4,968,723 A 11/1990 Senda et al.
(Continued)

FOREIGN PATENT DOCUMENTS

CN 103827194 A 5/2014
CN 104053713 A 9/2014
(Continued)

OTHER PUBLICATIONS

JP 2020-090609A machine translation. (Year: 2020).*
(Continued)

*Primary Examiner* — Catherine S Branch
(74) *Attorney, Agent, or Firm* — BACON & THOMAS, PLLC

(57) ABSTRACT

Polyethylene resin foamed particles according to the present invention are obtained by using, as a base material resin, a non-crosslinked linear low density polyethylene. The linear low density polyethylene is a copolymer of ethylene and an α-olefin having 8 carbon atoms, and has a melt flow rate and a density in specified ranges. The foamed particle has an average foam size within a specified range, and has a crystal structure that causes an intrinsic peak and a high temperature peak to appear in the first round of a DSC curve obtained under a specific condition. The total fusion heat quantity (ΔH1) determined from the sum total of a fusion heat quantity (ΔHi) of the intrinsic peak and the fusion heat quantity (ΔHh) of the high temperature peak is within a specified range.

7 Claims, 1 Drawing Sheet

(51) Int. Cl.
*B29K 23/00* (2006.01)
*B29K 105/04* (2006.01)

(52) U.S. Cl.
CPC .................. *B29K 2105/048* (2013.01); *B29K 2995/0012* (2013.01); *B29K 2995/0063* (2013.01)

(56) References Cited

U.S. PATENT DOCUMENTS

| | | | |
|---|---|---|---|
| 2010/0179236 A1 | 7/2010 | Bosnyak et al. | |
| 2015/0008607 A1* | 1/2015 | Tokiwa | B29C 44/08 264/45.4 |
| 2020/0199320 A1 | 6/2020 | Hu et al. | |

FOREIGN PATENT DOCUMENTS

| | | | | |
|---|---|---|---|---|
| JP | A58-076433 | A | | 5/1983 |
| JP | A60-058440 | A | | 4/1985 |
| JP | A64-001741 | A | | 6/1989 |
| JP | A03-002230 | A | | 8/1991 |
| JP | 06-316645 | A | | 11/1994 |
| JP | A08_113667 | A | | 5/1996 |
| JP | 2000-017079 | | | 1/2000 |
| JP | 2005-154729 | A | | 6/2005 |
| JP | 2006-88456 | A | | 4/2006 |
| JP | A2008-533289 | A | | 8/2008 |
| JP | 2010-532412 | A | | 10/2010 |
| JP | 2020090609 | A | * | 6/2020 |
| JP | 2020-532606 | A | | 11/2020 |
| WO | WO2006099631 | A1 | | 9/2006 |

OTHER PUBLICATIONS

Supplemetary European Search Report cited in Appln. No. EP22771126 dated Jan. 21, 2025.

International Search Report cited in corresponding Japanese Appln. No. PCT/JP2022/009096 dated Apr. 20, 2022.

International Search Report Family List cited in corresponding Japanese Appln. No. PCT/JP2022/009096.

Chinese Search Report dated Apr. 13, 2026, with translation cited in corresponding Chinese Appln. No. 202280021583.9.

* cited by examiner

POLYETHYLENE RESIN FOAMED PARTICLE, AND METHOD FOR PRODUCING SAME

TECHNICAL FIELD

The present invention relates to polyethylene-based resin expanded beads and, more particularly, to polyethylene-based resin expanded beads containing, as a base resin thereof, linear low density polyethylene that is a copolymer of ethylene and an α-olefin having 8 carbon atoms. The present invention is also directed to a method for producing the polyethylene-based resin expanded beads.

RELATED ART

Molded articles of polyethylene-based resin expanded beads are widely used as shock-absorbing packaging materials owning to their excellent formability and shock-absorbing performance, and are especially used as packaging materials for electrical or electronic devices, as they hardly damage the objects to be packaged. The expanded beads molded article is obtained, for example, by a method (in-mold molding method), in which polyethylene-based resin expanded beads filled in a mold are heated with a heating medium such as steam to cause secondary expansion of the expanded beads and to fusion bond them together, the obtained molded article being cooled with water or air within the mold and then released from the mold.

In the in-mold molding method for the polyethylene-based resin expanded beads molded article, crosslinked polyethylene-based resin expanded beads obtained by cross-linking and thereafter expanding low density polyethylene have been hitherto used. Such crosslinked polyethylene-based resin expanded beads, however, have problems that they are unable to be recycled. On the other hand, non-crosslinked expanded beads containing linear low density polyethylene as a base resin have come to be investigated, since it is easy to obtain expanded beads that may allow in-mold molding even though the linear low density polyethylene is not crosslinked.

As the linear low density polyethylene, a copolymer of ethylene and an α-olefin having 4 to 10 carbon atoms is used. Among others, an attempt has been made to obtain expanded beads using a copolymer of ethylene and an α-olefin having 8 carbon atoms.

Specifically, Patent Document 1 discloses a technique in which expanded beads having good moldability are able to be stably obtained by expanding linear low density polyethylene resin particles having a crystal structure that gives two endothermic peaks in a DSC curve measured under predetermined conditions. Patent Document 2 discloses a technique in which moldability is improved by using a copolymer of ethylene and an α-olefin having 4 to 10 carbon atoms, which has a predetermined melting point, density, MFR, etc. as a base resin for expanded beads, and by increasing the cell diameter of the expanded beads. Patent Document 3 discloses a technique for obtaining expanded beads having a low apparent density by using carbon dioxide and an aliphatic saturated hydrocarbon in a predetermined ratio as a blowing agent. In Examples of Patent Documents 1 to 3, production of expanded beads containing a copolymer of ethylene and 1-octene as a base resin is disclosed.

Conventionally, saturated hydrocarbons such as butane and chlorofluorocarbons such as dichlorodifluoromethane have been used as blowing agents for producing polyethylene-based resin expanded beads, as described in Patent Documents 1 to 3. However, in recent years, from the viewpoint of reducing the burden on the environment, the use of inorganic physical blowing agents has been demanded.

As examples of production of expanded beads using an inorganic physical blowing agent as a physical blowing agent, there may be mentioned techniques that are disclosed in Patent Document 4 and Patent Document 5. Specifically, Patent Document 4 discloses production of expanded beads having excellent moldability by using, as the base resin, a non-crosslinked polyethylene-based resin which gives a DSC curve having a specific shape when measured under predetermined conditions. Patent Document 4 discloses, as a method for adjusting the shape of the DSC curve, blending low density polyethylene, high-density polyethylene or the like having a density different from that of a non-crosslinked polyethylene resin.

Further, Patent Document 5 discloses production of expanded beads that contain, as a base resin, a copolymer of ethylene and an α-olefin having 6 or 8 carbon atoms having a specific density, MFR, and molecular weight distribution, that have a specific cell diameter, and that excel in moldability, etc. In Examples of Patent Documents 4 and 5, there is a disclosure of production of expanded beads using a copolymer of ethylene and 1-octene as the linear low density polyethylene.

PRIOR ART DOCUMENT

Patent Document

Patent Document 1: JP-A-H2-43206
Patent Document 2: JP-B-H6-86544
Patent Document 3: JP-A-H6-192464
Patent Document 4: JP-A-H6-271701
Patent Document 5: WO2013031745

SUMMARY OF THE INVENTION

Problems to be Solved by the Invention

In the case of the techniques of Patent Documents 1 to 3, there are no disclosures or teachings concerning production of expanded beads with a small apparent density (expanded beads with a large expansion ratio) in a stable manner using an inorganic physical blowing agent as a physical blowing agent and concerning provision of expanded beads that have a wide temperature range within which molding is able to be performed.

In addition, neither Patent Document 4 nor Patent Document 5 discloses or suggests production of expanded beads having a low apparent density in a stable manner and production of an expanded beads molded article having a low apparent density at a molding heating temperature widely ranging from a low to a high temperature. Moreover, the surface smoothness of the obtained expanded beads molded article has been found to have a room for improvement. Furthermore, it has been found that there is a room for improvement in the dimensional stability of the expanded beads molded article obtained by the technique described in Patent Document 5.

It is an objective problem of the present invention to provide polyethylene-based resin expanded beads that can form an expanded beads molded article having a low apparent density and a beautiful appearance at a molding heating temperature that ranges widely from a low to a high temperature. Another objective problem of the present invention is to provide a method for stably producing the expanded beads by an environmentally friendly process.

Means for Solving the Problems

In accordance with the present invention there are provided polyethylene-based resin expanded beads and a method for producing same, as follows.

[1] Polyethylene-based resin expanded beads comprising a base resin containing non-crosslinked linear low density polyethylene, said linear low density polyethylene being a copolymer of ethylene and an α-olefin having 8 carbon atoms and having a density of 0.922 g/cm$^3$ or more and less than 0.935 g/cm$^3$ and a melt flow rate of 0.8 g/10 min or more and 1.5 g/10 min or less, said base resin having a melting point (Tm) of 115° C. or more and 125° C. or less, said expanded beads having an average cell diameter of 50 μm or more and 220 μm or less, said expanded beads having a crystal structure that shows a first time DSC curve having an intrinsic melting peak which is intrinsic to the base resin and a high temperature melting peak which is located on a higher temperature side of the intrinsic melting peak, when said expanded beads are measured by heat flux differential scanning calorimetry in which a sample thereof is heated from 30° C. to 200° C. at a heating rate of 10° C./min, wherein a total heat of fusion (ΔH1) defined as a sum of a heat of fusion (ΔHi) of the intrinsic melting peak and a heat of fusion (ΔHh) of the high temperature melting peak is 110 J/g or more and 140 J/g or less.

[2] The polyethylene-based resin expanded beads according to above [1], wherein said expanded beads show a second time DSC curve having a melting peak having a heat of fusion (ΔH2) of 105 J/g or more and 125 J/g or less, when said expanded beads are measured by heat flux differential scanning calorimetry in which a sample thereof heated to 200° C. in the measurement of the first time DSC curve is cooled from 200° C. to 30° C. at a cooling rate of 10° C./min and then heated again from 30° C. to 200° C. at a heating rate of 10° C./min.

[3] The polyethylene-based resin expanded beads according to above [1] or [2], wherein a ratio (ΔHh/ΔH1) of the heat of fusion (ΔHh) of the high temperature melting peak to the total heat of fusion (ΔH1) is 0.20 or more and 0.30 or less.

[4] The polyethylene-based resin expanded beads according to any one of above [1] to [3], wherein the heat of fusion (ΔHh) of the high temperature melting peak is 15 J/g or more and 50 J/g or less.

[5] The polyethylene-based resin expanded beads according to any one of above [1] to [4], wherein a relationship between the melting point (Tm) of the base resin and the total heat of fusion (ΔH1) satisfies the following formula:

$$\Delta H1 > 10 \times Tm - 1090.$$

[6] The polyethylene-based resin expanded beads according to any one of above [1] to [5], wherein a density of the linear low density polyethylene is more than 0.925 g/cm$^3$ and less than 0.930 g/cm$^3$, and the melting point (Tm) of the base resin is 118° C. or higher and 122° C. or lower.

[7] The polyethylene-based resin expanded beads according to any one of above [1] to [6], wherein a bulk density of the expanded beads is 10 kg/m$^3$ or more and 50 kg/m$^3$ or less.

[8] A method for producing polyethylene-based resin expanded beads comprising the steps of:

(a) dispersing polyethylene-based resin particles comprising a base resin containing non-crosslinked linear low density polyethylene in a dispersing medium contained in a closed vessel;

said linear low density polyethylene being a copolymer of ethylene and an α-olefin having 8 carbon atoms and having a density of 0.922 g/cm$^3$ or more and less than 0.935 g/cm$^3$ and a melt flow rate of 0.8 g/10 m in or more and 1.5 g/10 m in or less, said base resin having and a melting point (Tm) of 115° C. or more and 125° C. or less and a heat of fusion (ΔHr) of 105 J/g or more and 125 J/g or less;

(b) injecting an inorganic physical blowing agent into the closed vessel to impregnate the polyethylene-based resin particles with the inorganic physical blowing agent;

(c) maintaining the dispersing medium, in which the polyethylene-based resin particles in the closed vessel are dispersed, at a temperature within the range of from a temperature lower by 30° C. than the melting point (Tm) of the base resin to a temperature less than the melting end temperature of the base resin; and (d) then releasing the blowing agent-impregnated polyethylene-based resin particles from the closed vessel together with the dispersing medium to an atmosphere having a pressure lower than that in the closed vessel.

Effect of the Invention

With the polyethylene-based resin expanded beads of the present invention that are constituted of a base resin containing a linear low density polyethylene which is a copolymer of ethylene and an α-olefin having 8 carbon atoms, since the linear low density polyethylene has a specific density and MFR, since the base resin has a melting point within a specific range, and since the expanded beads have specific thermal properties and a specific average cell diameter, it is possible to mold in a mold an expanded beads molded article which has a low apparent density, excellent dimensional stability and a beautiful appearance in a wide molding heating temperature range. Additionally, the method for producing polyethylene-based resin expanded beads of the present invention makes it possible to stably obtain the expanded beads using an inorganic physical blowing agent.

EMBODIMENTS OF THE INVENTION

Figure 1:
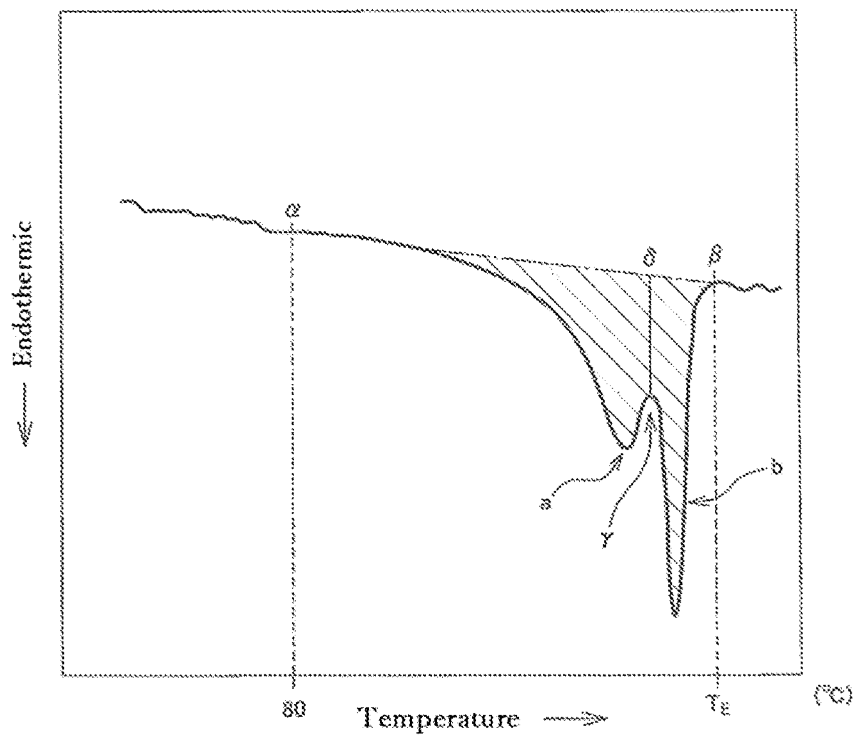
FIG. 1 is a schematic diagram showing an example of a first time DSC curve in heat flux differential scanning calorimetry of the expanded beads of the present invention.

The polyethylene-based resin expanded beads and the method for producing the same according to the present invention will be described in detail below.

In the present specification "A to B" representing a numerical range is synonymous with "A or more and B or less", and represents a numerical range including A and B which are the end points of the numerical range. Also, in the present specification and claims, the singular form (a, an, the) includes the plural form unless the context clearly dictates otherwise.

The polyethylene-based resin expanded beads of the present invention (hereinafter also simply referred to as expanded beads) comprise a base resin containing non-crosslinked linear low density polyethylene. As used herein, the term "base resin" refers to any resin and polymeric material capable of forming expanded beads having a multiplicity of cells.

In the present invention, the linear low density polyethylene is a copolymer of ethylene and an α-olefin having 8 carbon atoms. In the copolymer of ethylene and the α-olefin having 8 carbon atoms, monomers other than ethylene and the α-olefin having 8 carbon atoms may be further copolymerized to the extent that the intended objects and effects of the present invention are not adversely affected. However, the content of such other monomers is preferably 5% by mass or less, more preferably 3% by mass or less, still more preferably 1% by mass or less, based on 100% by mass of the copolymer of ethylene and an α-olefin having 8 carbon atoms. Especially, it is most preferred that the copolymer of ethylene and the α-olefin having 8 carbon atoms is substantially free of other monomers than ethylene and the α-olefin having 8 carbon atoms (content of the other monomers is substantially 0% by mass). The base resin of the expanded beads of the present invention preferably contains 80% by mass or more of the linear low density polyethylene. The content of the linear low density polyethylene in the base resin is more preferably 90% by mass or more, more preferably 95% by mass or more, still more preferably 97% by mass or more, and particularly preferably 100% by mass.

Since a copolymer of ethylene and an α-olefin having 8 carbon atoms is contained in the base resin of the expanded beads, it becomes easy to adjust a total heat of fusion in the first time curve of the expanded beads within the desired range, which is described hereinafter, and, hence, the expanded beads are excellent for in-mold molding of expanded beads with a small apparent density. From this point of view, the copolymer of ethylene and an α-olefin having 8 carbon atoms is preferably a copolymer of ethylene and 1-octene. For the same reason, the copolymer of ethylene and the α-olefin having 8 carbon atoms is preferably a polymer polymerized with a Ziegler-Natta polymerization catalyst.

The base resin may contain a polymer other than a copolymer of ethylene and an α-olefin having 8 carbon atoms to the extent that the intended objects and effects of the present invention are not adversely affected. Examples of such other polymer include polyethylene-based resins such as linear low density polyethylene, high density polyethylene and low density polyethylene, thermoplastic resins such as polypropylene-based resins, and other thermoplastic polymers such as thermoplastic elastomers. The content of such other polymer is preferably 20% by mass or less, more preferably 10% by mass or less, still more preferably 5% by mass or less, yet more preferably 3% by mass or less, based on 100% by mass of the base resin. It is particularly preferred that the base resin is substantially free of polymers other than copolymers of ethylene and an α-olefin having 8 carbon atoms (the content of the other polymers is substantially 0% by mass).

The linear low density polyethylene should be non-crosslinked. Conventionally, crosslinked low density polyethylene has been used because of its excellent foamability and excellent in-mold moldability of expanded beads molded articles. However, the crosslinked expanded beads are difficult to be reused by recycling and, hence, may impose a load on the environment. On the other hand, linear low density polyethylene, even though it is non-crosslinked, exhibits good foamability and in-mold moldability, because a change in melt viscosity thereof due to temperature variation is moderate. Additionally, non-crosslinked polyethylene-based resin expanded beads can be easily recycled and can reduce the environmental load.

The term "non-crosslinked" as used herein means that an insolubles content of the expanded beads is 5% by mass or less as measured by a hot xylene extraction method. From the viewpoint of facilitating recycling of the expanded beads, the insolubles content of the expanded beads determined by a method of extraction of the expanded beads with hot xylene is preferably 3% by mass or less, most preferably 0% by mass. The xylene-insolubles content of the expanded beads by the hot xylene extraction method is determined as follows. About 1 g of precisely weighed expanded beads (the weight of the test sample is L (g)) are placed in a 150 mL round-bottomed flask, to which 100 mL of xylene is added. The flask is heated with a mantle heater. After refluxing for 6 hours, the undissolved residues are quickly filtered through a 100-mesh wire mesh, separated and dried in a vacuum dryer at 80° C. for 8 hours or more. The dried mass is weighed to measure the weight M (g). The insolubles content by the hot xylene extraction method is obtained by the following formula:

$$\text{Insolubles content (\% by mass) by hot xylene extraction method} = (M/L) \times 100$$

where M and L are as defined above.

The density of the linear low density polyethylene used in the present invention is 0.922 g/cm$^3$ or more and less than 0.935 g/cm$^3$. When the density is excessively low, an expanded beads molded article after release from a mold tends to shrink and deform and, hence, there is a possibility that the molding heating temperature range within which a good expanded beads molded article is able to be molded becomes narrow. In addition, there is a possibility that expanded beads with a small apparent density are difficult to be produced in a stable manner. From this point of view, the density of the linear low density polyethylene is preferably 0.923 g/cm$^3$ or more, more preferably 0.925 g/cm$^3$ or more, still more preferably more than 0.925 g/cm$^3$. On the other hand, when the density is excessively high, there is a possibility that the flexibility of an obtained expanded beads molded article is reduced and, hence, the cushioning properties thereof may be impaired. In addition, there is a possibility that an expanding temperature range within which expanded beads having a low apparent density are able to be stably produced becomes narrow. From this point of view, the density of the linear low density polyethylene is more preferably less than 0.933 g/cm$^3$, still more preferably less than 0.930 g/cm$^3$.

The melt flow rate (MFR) of the linear low density polyethylene used in the present invention is 0.8 g/10 min or more and 1.5 g/10 min or less. When the MFR is excessively large, obtained expanded beads tend to have a high open cell content, and, hence, there is a possibility that a molding heating temperature range in which good expanded beads molded articles are able to be formed becomes narrow. From this point of view, the MFR of linear low density polyethylene is preferably 1.4 g/10 min or less, more preferably 1.2 g/10 min or less. On the other hand, when the MFR is excessively small, the secondary expandability of the expanded beads may be lowered and, hence, a surface smoothness of the obtained expanded beads molded article may be impaired. From this point of view, the melt flow rate (MFR) is preferably 0.9 g/10 min or more, more preferably 1.0 g/10 min or more.

As used herein, MFR of the linear low density polyethylene refers to a melt mass flow rate measured based on JIS K7210-1 (2014) under the conditions involving a temperature of 190° C. and a load of 2.16 kgf.

In the present invention, a melting point (Tm) of the base resin is 115° C. or higher and 125° C. or lower. When the melting point is excessively high, there is a possibility that the fusion bondability will be lowered in molding at a low molding heating temperature. In addition, there is a possibility that an expanding temperature range within which expanded beads having a low apparent density are able to be stably produced becomes narrow. From this point of view, the melting point of the base material is preferably 124° C. or lower, more preferably 122° C. or lower. On the other hand, when the melting point is excessively low, the expanded beads molded article after having been released from the mold is apt to shrink and deform and, hence, there is a possibility that a molding heating temperature range within which a good expanded beads molded article is able to be molded becomes narrow. From this point of view, the melting point (Tm) of the base resin is preferably 116° C. or higher, more preferably 118° C. or higher.

As used herein, the melting point (Tm) of the base resin is measured by the transition temperature measuring method for a plastic as referenced in JIS K7121 (1987). That is, according to "(2) Measurement of the melting temperature after performing a definite heat treatment", a sample is first subjected to condition adjustment by heating the sample from 30° C. to 200° C. at a heating rate of 10° C./min and then cooling at a cooling rate of 10° C./min to 30° C. Thereafter, differential scanning calorimetry is performed by heating from 30° C. to 200° C. at a heating rate of 10° C./min to obtain a DSC curve. A peak top temperature of the endothermic peak of the obtained DSC curve is defined as the melting point (Tm). When a plurality of endothermic peaks appear in the DSC curve, the peak top temperature of the endothermic peak that has the highest peak is taken as the melting point (Tm).

It is preferred that a tensile modulus of the base resin is 200 MPa or more and 350 MPa or less. When the tensile modulus is within this range, the expanded beads have excellent in-mold moldability. In addition, the expanded beads molded article obtained therefrom has more excellent surface protective properties. For these reasons, the tensile modulus is more preferably 220 MPa or more and 300 MPa or less, still more preferably 230 MPa or more and 280 MPa or less.

As used herein the tensile modulus is as measured according to the measurement method referenced in JIS K7161-2 (2014).

The expanded beads of the present invention have a specific crystal structure that satisfies the following requirements (1) and (2).

(1) The expanded beads have a crystal structure that shows a first time DSC curve having an intrinsic melting peak which is intrinsic to the base resin and a high temperature melting peak which is located on a higher temperature side of the intrinsic melting peak, when the expanded beads are measured by heat flux differential scanning calorimetry in which a sample thereof is heated from 30° C. to 200° C. at a heating rate of 10° C./min. The intrinsic melting peak and high temperature melting peak may be hereinafter also simply referred to as intrinsic peak and high temperature peak, respectively.

The expanded beads, which have a crystal structure in which a high-temperature peak appears in the first DSC curve, have excellent in-mold moldability. In addition, the expanded beads molded article obtained therefrom have improved mechanical properties such as compressive strength.

(2) Further, in the first time DSC curve, a total heat of fusion ($\Delta H1$) defined as a sum of a heat of fusion ($\Delta Hi$) of the intrinsic melting peak and a heat of fusion ($\Delta Hh$) of the high temperature melting peak is 110 J/g or more and 140 J/g or less. When the total heat of fusion ($\Delta H1$) of the expanded beads is within the above range, it is possible to form an expanded beads molded article with a small apparent density and a beautiful appearance in a wide range of the molding heating temperature. In addition, the obtained expanded beads molded article has a small shrinkage rate and is excellent in dimensional stability. It is believed that this is because an amount of the crystals that are able to be melted during in-mold molding is adjusted to be an appropriate amount.

When the total heat of fusion ($\Delta H1$) of the expanded beads is excessively small, the expanded beads molded article tends to shrink and deform after release from the mold and, hence, there is a possibility that the molding heating temperature range in which a good expanded beads molded product is able to be molded becomes narrow. From this point of view, the total heat of fusion ($\Delta H1$) of the expanded beads is preferably 115 J/g or more, more preferably 118 J/g or more. On the other hand, when the total heat of fusion ($\Delta H1$) of the expanded beads is excessively large, it may not be possible to obtain a good expanded beads molded product at a low molding heating temperature. In addition, there is a possibility that the range of expanding temperature in which expanded beads having a low apparent density are able be stably produced becomes narrow. From this point of view, the total heat of fusion ($\Delta H1$) of the expanded beads is preferably 135 J/g or less, more preferably 130 J/g or less, particularly preferably 125 J/g or less.

The expanded beads with a total heat of fusion ($\Delta H1$) of 110 J/g or more and 140 J/g or less may be easily obtained when the base resin has a heat of fusion ($\Delta Hr$) of 105 J/g or more and 125 J/g or less. In addition, in a dispersing medium release foaming method described hereinafter, the total heat of fusion ($\Delta H1$) may also be adjusted by an addition amount of a blowing agent and by conditions such as a temperature and a retention time in a high temperature peak forming step thereof.

The total heat of fusion ($\Delta H1$) of the expanded beads may be easily adjusted to the above range because the base resin of the expanded beads contains a copolymer of ethylene and an α-olefin having 8 carbon atoms. Examples of the copolymer of ethylene and α-olefins having 8 carbon atoms that gives the base resin having a heat of fusion ($\Delta Hr$) within the above range include those of trade names Dowlex 2049G, 2049B and 2042G (manufactured by Dow Chemical Company).

The heat of fusion ($\Delta Hr$) of the base resin is a value determined from an area of a melting peak of a second time DSC curve obtained by heat flux differential scanning calorimetry in which a sample of polyethylene-based resin particles that are used for producing expanded beads is heated from 30° C. to 200° C. at a heating rate of 10° C./min, then cooled from 200° C. to 30° C. at a cooling rate of 10° C./min and heated again from 30° C. to 200° C. at a heating rate of 10° C./min. As the sample, there may also be used raw material pellets of the base resin that constitutes the polyethylene-based resin particles.

FIG. 1 shows an example of a first time DSC curve obtained by heat flux differential scanning calorimetry of the expanded beads of the present invention. In FIG. 1, "a" designates an intrinsic peak appearing on a low temperature side, "b" designates a high temperature peak, and $T_E$ designates a melting end temperature at which the higher temperature side of the endothermic peak "b" returns to the baseline position. Incidentally, the high temperature peak "b" is an endothermic peak that appears in the first time DSC curve but does not appear in a second DSC curve and that appears on a higher temperature side than an endothermic peak "c" in the second time DSC curve in hereinafter described FIG. 2.

In the DSC curve, the heat of fusion (ΔHi) of the intrinsic peak and the heat of fusion (ΔHh) of the high temperature peak in the first time DSC curve are determined as follows. First, a straight line (α-β) extending between a point α on the DSC curve at 80° C. and a point β on the DSC curve at a melting end temperature $T_E$ is drawn. The melting end temperature $T_E$ is a temperature of a point at which the DSC curve on a high temperature side of the high temperature peak "b" meets the base line. Next, a straight line which passes a point γ on the DSC curve at the bottom of the valley between the intrinsic peak "a" and the high temperature peak "b" and which is parallel with the ordinate is drawn. The intersection between this straight line and the straight line (α-β) is designated as a point δ. The heat of fusion (ΔHi) of the intrinsic peak "a" is a calorific value corresponding to the region defined by the straight line (δ-γ), the DSC curve of the intrinsic peak "a" and the straight line (α-δ). The heat of fusion of the high temperature peak "b" is a calorific value corresponding to the region defined by the straight line (γ-δ), the DSC curve of the high temperature peak "b" and the straight line (δ-β).

In the present invention, the DSC curve is obtained by differential scanning calorimetry (DSC) in accordance with JIS K7121 (1987) using 1-3 mg of expanded beads as a test sample. As a measuring device, for example, a heat flux differential scanning calorimeter (manufactured by SII Nanotechnology Inc., model number: DSC7020) may be used for measurement.

It is preferred that the expanded beads of the present invention show a second time DSC curve having a melting peak having a heat of fusion (ΔH2) of 105 J/g or more and 125 J/g or less, when the expanded beads are measured by heat flux differential scanning calorimetry in which a sample thereof heated to 200° C. in the measurement of the first time DSC curve is cooled from 200° C. to 30° C. at a cooling rate of 10° C./min and then heated again from 30° C. to 200° C. at a heating rate of 10° C./min. When the heat of fusion (ΔH2) of the expanded beads in the second DSC is within the above range, a molding heating temperature range, in which a good expanded beads molded article is able to be formed, may be further widened. From this point of view, the heat of fusion (ΔH2) is more preferably 105 J/g or more and 120 J/g or less, particularly preferably 108 J/g or more and 115 J/g or less.

The melting peak in the second DSC curve is preferably a single melting peak. The single melting peak, however, may have a shoulder "d" on its endothermic peak curve. When the melting peak is a single peak, the obtained expanded beads molded article has improved rigidity.

When the expanded beads of the present invention containing as a base resin a copolymer of ethylene and an α-olefin having 8 carbon atoms give a single endothermic peak in the second DSC curve thereof, a molding heating temperature range within which a good expanded beads molded article is able to be formed is wide and, hence, in-mold moldability thereof is excellent, notwithstanding the fact that the temperature range of the endothermic peak is relatively narrow.

The effect attained by the present invention is unexpected from the prior art in view of the fact that, in the conventional expanded beads containing as a base resin a copolymer of ethylene and an α-olefin having 8 carbon atoms, it has been recommended to use expanded beads having a plurality of melting peaks in their second DSC curve or expanded beads having a wide peak width in their DSC curve (for example, JP-A-H7-216153). The temperature width of the endothermic peak means the temperature width at ½ of the peak height and is preferably 8° C. or less, more preferably 7° C. or less, still from more preferably 6° C. or less, from the viewpoint of increasing the rigidity of the obtained expanded beads molded article.

Figure 2:
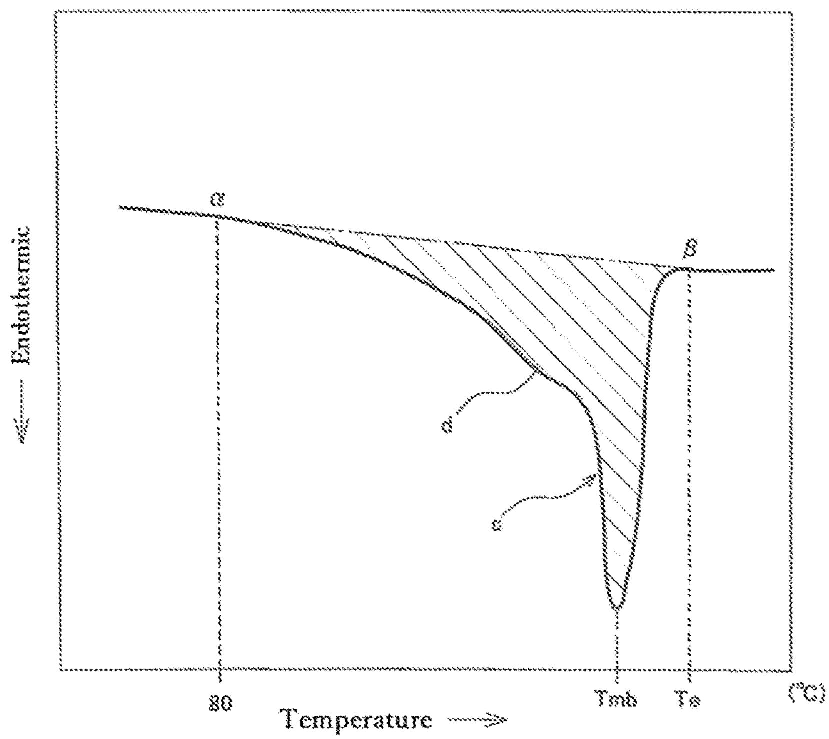
FIG. 2 is a schematic diagram showing an example of a second time DSC curve in heat flux differential scanning calorimetry of the expanded beads of the present invention.

FIG. 2 shows an example of a DSC curve obtained in the second time measurement. In FIG. 2, c designates an endothermic peak, Tmb designates a peak top temperature of the endothermic peak c and is a melting point of the expanded beads, Te designates a point at which the DSC curve on the high temperature side of peak c touches the baseline and is a melting end temperature, and d designates a shoulder. A heat of fusion (ΔH2) of the melting peak in the second DSC curve is a calorific value corresponding to the region defined, as shown in FIG. 2, by the DSC curve and a straight line (α-β) that connects a point α at 80° C. of the DSC curve and a point β on the DSC curve at melting end temperature Te of the expanded beads.

It is preferred that a ratio (ΔHh/ΔH1) of the heat of fusion (ΔHh) of the high temperature peak to the total heat of fusion (ΔH1) of the expanded beads is 0.20 or more and 0.30 or less. When the ratio (ΔHh/ΔH1) is within this range, the in-mold moldability of the expanded beads and the physical properties of the resulting expanded beads molded article are well balanced. From this point of view, the ratio (ΔHh/ΔH1) is more preferably 0.22 or more and 0.28 or less.

The heat of fusion (ΔHh) of the high temperature peak is preferably 15 to 50 J/g. When the heat of fusion (ΔHh) of the high temperature peak is within this range, the expanded beads are excellent in-mold moldability. In addition, the rigidity of the expanded beads molded article obtained therefrom is improved. For these reasons, the heat ΔHh is more preferably 20 to 45 J/g, particularly preferably 25 to 40 J/g.

It is preferred that the melting point (Tm) [° C.] of the base resin and the total heat of fusion (ΔH1) [J/g] of the expanded beads satisfy the following formula.

$$\Delta H1 > 10 \times Tm - 1090$$

The above formula (1) indicates that the melting point (Tm) of the base resin is relatively low and the total heat of fusion (ΔH1) of the expanded beads is relatively large. It is particularly preferable that the expanded beads of the present invention use a base resin that satisfies the above formula (1). When the expanded beads of the present invention satisfy the above formula (1), it is possible to stably broaden the range of molding heating temperature that enables molding of an expanded beads molded article having a low apparent density and a beautiful appearance.

In the present invention, the average cell diameter of the expanded beads is 50 μm or more and 220 μm or less. When the average cell diameter of the expanded beads is excessively small, there is a possibility that the in-mold moldability may deteriorate. From this point of view, the average cell diameter of the expanded beads is preferably 80 μm or more, more preferably 100 μm or more, particularly preferably 120 μm or more. When the average cell diameter of the expanded beads is excessively large, on the other hand, the surface smoothness of the resulting expanded beads molded article may be impaired. From this point of view, the average cell diameter of the expanded beads is preferably 200 μm or less, more preferably 180 μm or less, particularly preferably 160 μm or less.

The expanded beads of the present invention may be produced by, for example, a so-called dispersing medium release foaming method using an inorganic physical blowing agent such as carbon dioxide. Conventionally, the expanded beads produced by such a method using an inorganic physical blowing agent as the blowing agent tend to have small cell diameters and, hence, there has been a problem that the in-mold moldability is apt to deteriorate. The expanded beads of the present invention have excellent in-mold moldability in spite of having a small average cell diameter and, thus, the resulting expanded beads molded article has excellent surface smoothness and a beautiful appearance.

As used herein, the average cell diameter of the expanded beads is measured as follows. An expanded bead is approximately bisected and the obtained cross-section is enlargedly photographed with a microscope such that the entire cross-section magnified is included. On the obtained photograph a straight line is drawn such that the area of the cross-section is approximately bisected. A value obtained by dividing a length of a line segment thereof from the periphery of the expanded bead to the opposite periphery thereof by a number of all cells intersecting with the line segment is defined as the average cell diameter of the expanded bead. The above operation is performed on randomly selected 20 expanded beads, and the value obtained by arithmetically averaging the average cell diameters of the 20 expanded beads is defined as the average cell diameter of the expanded beads.

It is preferred that a bulk density of the expanded beads is 10 $kg/m^3$ or more and 50 $kg/m^3$ or less. When the apparent density is within the above range, a balance between lightness in weight and mechanical strengths of the molded article obtained is able to be improved. For this reason, the apparent density of the expanded beads is more preferably 15 $kg/m^3$ or more and 40 $kg/m^3$ or less, particularly preferably 18 $kg/m^3$ or more and 30 $kg/m^3$ or less. The expanded beads of the present invention have excellent in-mold moldability although the bulk density thereof is relatively low.

In the present invention, two stage expansion may be performed in order to obtain expanded beads with a low bulk density. Specifically, it is possible to obtain expanded beads having a further reduced apparent density by a method which includes charging expanded beads obtained by a dispersing medium release foaming method, described hereinafter, in a pressurizable closed vessel, injecting a gas such as air under pressure into the vessel to perform a pressurizing treatment and to increase the internal pressure in cells thereof, then taking the expanded beads out from the vessel, and heating them with steam or hot air to again expand them.

The bulk density of the expanded beads is measured as follows. First, the expanded beads are allowed to stand for two days under the conditions including a relative humidity of 50%, a temperature of 23° C. and 1 atm to condition the expanded beads. Next, an arbitrary amount of the expanded beads is placed in a graduated cylinder with a volume of 1 L such that a large number of the expanded beads are filled up to the 1 L scale thereof in a natural sedimentation state. The bulk density of the expanded beads is obtained by dividing the mass W1 [g] of the accommodated expanded beads by the accommodated volume V1 [L] thereof (W2/V2), followed by unit conversion to [$kg/m^3$].

It is preferred that the closed cell content of the expanded beads of the present invention is 80% or more, more preferably 85% or more, particularly preferably 90% or more. When the closed cell content is within the above range, the moldability of the expanded beads and the mechanical properties of the obtained expanded beads molded article are able to be further improved.

The closed cell content of the expanded beads is measured as follows. The expanded beads are allowed to stand for 2 days for aging in a thermostatic chamber at 23° C. under atmospheric pressure and a relative humidity of 50%. In the same thermostatic chamber, the expanded beads thus aged are sampled and measured for the precise apparent volume Va by a water immersion method described below. The sample beads whose apparent volume Va has been measured are fully dried and measured for their true volume Vx according to Procedure C of ASTM D-2856-70 using Air Comparison Pycnometer model-930 manufactured by Toshiba Beckman Inc. From the volumes Va and Vx, the closed cell content is calculated by the formula shown below.

$$\text{Closed cell content (\%)} = (Vx - W/\rho) \times 100/(Va - W/\rho)$$

wherein

Vx represents the true volume of the expanded beads measured by the above method, which corresponds to a sum of a volume of the resin constituting the expanded beads and a total volume ($cm^3$) of all the closed cells in the expanded beads, Va represents an apparent volume ($cm^3$) of the expanded beads, which is measured from a rise of the water level when the expanded beads are immersed in water contained in a measuring cylinder, W is a weight (g) of the sample expanded beads used for the measurement; and ρ is a density ($g/cm^3$) of the resin constituting the expanded beads.

A method for producing the expanded beads of the present invention will be next explained. The expanded beads are produced by a so-called dispersing medium release foaming method which includes the following steps (a) to (d): a step (a) of dispersing polyethylene-based resin particles comprised of a base resin containing uncrosslinked linear low density polyethylene in a dispersion medium in a closed container; a blowing agent impregnation step (b) of impregnating the polyethylene-based resin particles dispersed in the dispersion medium with a blowing agent; a high-temperature peak forming step (c) of maintaining the dispersion medium in which the polyethylene-based resin particles are dispersed at a predetermined temperature; and an expanding step (d) of foaming the polyethylene-based resin particles impregnated with a blowing agent. The high temperature peak forming step (c) is a step by which a crystal structure that shows a first time DSC curve having a high temperature peak is formed in the expanded beads obtained in the succeeding expanding step (d). The first time DSC curve is measured by the above-described heat flux differential scanning calorimetry. The crystal structure is considered to be attributed to recrystallization of the melted base resin.

The polyethylene-based resin particles (hereinafter occasionally simply referred to as resin particles) used in the step (a) may be produced by any known method. For example, in a preferred embodiment, the base resin containing the non-crosslinked linear low density polyethylene and additives such as a cell control agent that are added as necessary are fed to an extruder and melt and knead. The obtained melt-kneaded product is extruded in the form of strands through holes of a die attached to the tip of the extruder. The obtained strand-like extrudate is cooled by, for example, being submerged in water and, thereafter, cut with a pelletizer to produce resin particles (strand cut method) in such a way that the resin particles each have a predetermined weight. In an alternate preferred embodiment, the melt-kneaded product is extruded from small holes of the die into water and, immediately thereafter, the extrudate in water is cut into resin particles in such a way that the obtained particles each have a predetermined weight (under-water cutting method).

The polyethylene-based resin particles are constituted of a base resin containing non-crosslinked linear low density polyethylene, wherein

- the linear low density polyethylene is a copolymer of ethylene and an α-olefin having 8 carbon atoms,
- the linear low density polyethylene has a density of 0.922 g/cm$^3$ or more and less than 0.935 g/cm$^3$,
- the linear low density polyethylene has a melt flow rate of 0.8 g/10 min or more and 1.5 g/10 min or less,
- the base resin has melting point (Tm) of 115° C. or higher and 125° C. or lower, and
- the base resin has heat of fusion (ΔHr) of 105 J or higher and 125 J/g or lower.

The average weight per one resin particle is preferably 0.2 to 10 mg, more preferably 0.5 to 5 mg. The shape of the resin particles may be cylindrical, spherical, prismatic or oval. The expanded beads obtained by expanding such resin particles have a shape substantially corresponding to the shape of the resin particles before expansion.

In addition, the resin particles may be added with a cell controlling agent in advance in order to adjust the apparent density and cell diameter of the resulting expanded beads to appropriate values. As the cell controlling agent, there may be used an inorganic substance such as talc, calcium carbonate, borax, zinc borate, aluminum hydroxide and silica, or a polymer such as polytetrafluoroethylene, polyethylene wax, a polycarbonate and crosslinked polystyrene. Generally, the amount of the cell controlling agent added is preferably 0.001 to 5 parts by mass, more preferably 0.005 to 3 parts by mass, still more preferably 0.01 to 2 parts by mass, based on 100 parts by mass of the linear low density polyethylene. The resin particles may also contain, as necessary, additives such as a crystal nucleating agent, a coloring agent, a flame retardant, a flame retardant aid, a plasticizer, an antistatic agent, an antioxidant, a UV inhibitor, a light stabilizer, a conductive filler, antibacterial agent.

In the dispersing step (a), the resin particles are dispersed in a dispersion medium in, for example, a closed container. Specifically, the resin particles are dispersed in a dispersion medium and heated in a closed vessel such as a pressure-resistant container (for example, an autoclave).

Water is generally used as a dispersion medium for dispersing the resin particles. Further, when dispersing the resin particles in the dispersion medium, a dispersant may be added to the dispersion medium, if necessary. Examples of dispersants include fine particles of aluminum oxide, titanium oxide, basic magnesium carbonate, basic zinc carbonate, calcium carbonate, kaolin, mica and clay. These dispersants are usually used in an amount of about 0.001 to 5 parts by mass per 100 parts by mass of resin particles.

When the dispersant is used, it is preferable to conjointly use, as a dispersing aid, an anionic surfactant such as sodium dodecylbenzenesulfonate, sodium alkylbenzenesulfonate, sodium laurylsulfate and sodium oleate. The amount of the dispersing aid added is preferably 0.001 to 1 part by mass per 100 parts by mass of the resin particles.

In the blowing agent impregnation step (b), the resin particles dispersed in the dispersion medium are impregnated with an inorganic physical blowing agent. Specifically, an inorganic physical blowing agent is injected into a closed vessel in which the resin particles are dispersed to impregnate the resin particles with the blowing agent under heat and pressure.

An inorganic physical blowing agent is used as the blowing agent. Examples of the inorganic physical blowing agent include nitrogen, carbon dioxide, argon, air, etc., and these may be used in combination of two or more. The inorganic physical blowing agent does not deplete the ozone layer and is an inexpensive blowing agent. Among them, nitrogen, air and carbon dioxide are preferred, and carbon dioxide is more preferred. Incidentally, although an organic physical blowing agent may be used as a physical blowing agent, the blending amount thereof based on 100% by mass of the physical blowing agent is preferably 20% by mass or less, more preferably 10% by mass or less, most preferably 0% by mass (namely an inorganic physical blowing agent is used by itself as the physical blowing agent).

The using amount of the blowing agent is determined according to the apparent density of the expanded beads to be obtained with the consideration of the kind of the linear low density polyethylene used as the base resin and of the type of the blowing agent, etc. Generally, it is preferable to use 0.5 to 30 parts by mass, more preferably 1 to 15 parts by mass of the physical blowing agent based on 100 parts by mass of the resin particles.

When carbon dioxide is used as the blowing agent for the production of expanded beads by a dispersing medium release foaming method, the cell diameter tends to be small and, hence, the in-mold moldability is liable to be reduced depending on the type of resin. The expanded beads obtained by the production method of the present invention, in which a linear low density polyethylene having the above-described constitution is used as a base resin, are capable of forming an expanded beads molded article with a low apparent density in a wide molding heating temperature range, although the expanded beads are produced by a dispersion medium release foaming method using carbon dioxide.

In the high temperature peak forming step (c), the dispersion medium in which the resin particles are dispersed is heated at a temperature (Ta) in the range of from a temperature lower by 30° C. than the melting point (Tm) of the base resin of the resin particles (Tm−30° C.) to a temperature lower than the melting end temperature (Te) of the base resin. As a consequence of the step (c), expanded beads obtained in the succeeding step (d) are formed with a crystal structure showing a high temperature peak in the first time DSC curve by heat flux differential scanning calorimetry in which a sample thereof is heated from 30° C. to 200° C. at a heating rate of 10° C./min.

Specifically, when the resin particles are dispersed and heated in a dispersion medium in a closed vessel, the temperature thereof is raised so as not to exceed the melting end temperature (Te) of the base resin to melt a part or greater part of crystals of the linear low density polyethylene. Further, the dispersion medium is maintained at a retention temperature (Ta) that is within the range of from a temperature lower by 30° C. than the melting point (Tm) of the base resin (Tm−30° C.) to a temperature lower than the melting end temperature (Te) of the base resin for a period of time sufficient to recrystallize at least part of the crystals, preferably about 1 to 60 minutes, so that a crystal structure showing a high temperature peak is formed. The range of the retention temperature (Ta) is an appropriate temperature range when an inorganic physical blowing agent is used as the blowing agent.

Generally, the high temperature peak forming step (c) is performed after the blowing agent impregnation step (b). However, the high temperature peak forming step (c) may be performed before or simultaneously with the blowing agent impregnation step (b). Also, the retention temperature (Ta) may be kept constant or changed during the high temperature peak forming step (c). For example, after the blowing agent impregnating step (b), the dispersion medium in which the resin particles are dispersed is heated continuously or stepwise to a temperature that is not lower by 30° C. than the melting point (Tm) but that is not higher than the melting end temperature over a sufficient period of time, thereby forming a high temperature peak.

In the expanding step (d), the resin particles impregnated with the blowing agent are released together with the dispersion medium into an atmosphere which is lower in pressure than that within the closed vessel to foam and expand the resin particles. Specifically, after the high-temperature peak forming step (c), the blowing agent-containing resin particles are released together with the aqueous medium from the pressure resistive vessel into a lower pressure atmosphere at the expanding temperature Tb to obtain expanded beads. The temperature at which the resin particles are expanded (expanding temperature Tb) is preferably in the range from a temperature lower by 15° C. than the melting point (Tm) of the base resin to a temperature not higher by 10° C. than the melting end temperature.

The heat of fusion (ΔHh) of the high temperature peak is also able to be adjusted by changing conditions such as the retention temperature Ta, the holding time at this temperature and the expanding temperature Tb. For example, the heat of fusion (ΔHh) of the high temperature peak of the expanded beads tends to increase as the retention time at the retention temperature Ta increases, and tends to increase as the expanding temperature Tb decreases.

According to the production method of the present invention described above, it is possible to easily produce expanded beads that are capable of being molded in a wide molding heating temperature range into an expanded beads molded article having a low apparent density and a beautiful appearance. In addition, the expanded beads are able to be stably obtained by using an inorganic physical blowing agent.

Next, the polyethylene-based resin expanded beads molded article (hereinafter also simply referred to as expanded beads molded article or molded article) obtained by in-mold molding of the expanded beads of the present invention will be described. The expanded beads molded article is obtained by in-mold molding of the expanded beads.

The method for producing an expanded beads molded article by in-mold molding of the expanded beads of the present invention may use a known in-mold molding technique. As the method for producing the expanded beads molded article there may be mentioned, for example, a method for producing an expanded beads molded article by a cracking molding method which includes filling expanded beads in a mold cavity under atmospheric pressure or reduced pressure using a pair of molds for molding expanded beads, closing the mold in such a way that the mold cavity volume is reduced by 5% to 50% by volume to compress the expanded beads, then feeding a heating medium such as steam into the mold to heat and fusion-bond the expanded beads (for example, Japanese Patent Publication No. S46-38359); a pressurizing molding method which includes subjecting expanded beads to a pressurizing treatment using a heating medium such as air to increase the pressure inside the expanded beads, filling the expanded beads in a mold cavity of the mold which is under atmospheric pressure or reduced pressure, closing the mold, and then feeding a heating medium such as steam to heat and fusion bond the expanded beads (for example, Japanese Patent Publication No. 51-22951); a compression filling molding method which includes pressurizing a mold cavity to a given pressure higher than the ambient pressure using a compressed gas, filling the expanded beads thereinto while compressing the expanded beads to a pressure higher than the given pressure, and then feeding a heating medium such as steam to heat and fusion bond the expanded beads (for example, Japanese Patent Publication No. H4-46217); an ambient pressure filling molding method which includes filling the expanded beads in a cavity of a pair of molds under atmospheric pressure, and then feeding a heating medium such as steam to heat and fusion bond the expanded beads (for example, Japanese Patent Publication No. 6-49795); and a method in which the above methods are combined (for example, Japanese Patent Publication No. H6-22919).

The density of the expanded beads molded article produced by in-mold molding of the expanded beads of the present invention (hereinafter also referred to as the molded article density) is preferably in the range of 10 to 50 $kg/m^3$, more preferably 18-30 $kg/m^3$, in order to achieve both lightness in weight and rigidity thereof.

The density ($kg/m^3$) of the expanded beads molded article may be calculated by dividing the weight (g) of the molded article by the volume (L) obtained from the outer dimensions of the molded article, followed by unit conversion. The volume of the expanded bead molded product may also be determined by a water immersing method.

The molded article obtained by molding the expanded beads of the present invention in a mold, which hardly injures an article to be packaged therewith, may be suitably used as a shock-absorbing packaging material, in particular for application such as packaging material for electric and electronic devices and for application such as distribution cushioning materials, e.g., cushioning materials for cargo transportation of goods.

The present invention will be described in more detail below by way of examples. These examples are not restrictive of the present invention, however.

In Examples and Comparative Examples, the linear low density polyethylene shown in Table 1 was used by itself as the base resin. In Table 1, LLDPE1 is Dowlex 2049G manufactured by Dow Chemical Company, and LLDPE2 is Dowlex 2042G manufactured by Dow Chemical Company.

TABLE 1

| | Abbreviation | | | | | | | | |
|---|---|---|---|---|---|---|---|---|---|
| | LLDPE1 | LLDPE2 | LLDPE3 | LLDPE4 | LLDPE5 | LLDPE6 | LLDPE7 | LLDPE8 | LLDPE9 |
| Kind | Linear low density polyethylene | Linear low density polyethylene | Linear low density polyethylene | Linear low density polyethylene | Linear low density polyethylene | Linear low density polyethylene | Linear low density polyethylene | Linear low density polyethylene | Linear low density polyethylene |
| Catalyst | Z-N | Z-N | Z-N | Z-N | Z-N | Z-N | Z-N | Z-N | Z-N |
| Carbon number of comonomer | 8 | 8 | 8 | 8 | 8 | 8 | 6 | 6 | 4 |
| Kind of Comonomer | 1-octene | 1-octene | 1-octene | 1-octene | 1-octene | 1-octene | 1-hexene | 4-methyl-pentene-1 | 1-butene |
| Density [g/cm$^3$] | 0.926 | 0.930 | 0.935 | 0.926 | 0.920 | 0.935 | 0.924 | 0.927 | 0.920 |
| Melting point Tm [° C.] | 120 | 121 | 122 | 124 | 122 | 126 | 120 | 123 | 122 |
| Heat of fusion ΔHr [J/g] | 108 | 121 | 140 | 116 | 100 | 140 | 92 | 104 | 76 |
| MFR [g/10 min] | 1.1 | 1.0 | 2.5 | 2.0 | 1.0 | 1.0 | 1.4 | 2.3 | 1.0 |
| Tensile modulus [MPa] | 260 | 350 | 450 | 500 | 340 | 750 | 200 | 330 | 350 |

In Table 1, the melting point Tm and the heat of fusion ΔHr were measured as follows. As a test sample, 2 mg of linear low density polyethylene being the base resin in the form of a pellet was used. The sample was heated from 30° C. to 200° C. at a heating rate of 10° C./min according to the heat flux differential scanning calorimetry described in JIS K7121(1987) and then cooled to 30° C. at a cooling rate of 10° C./min. The sample was then heated again from 30° C. to 200° C. at a heating rate of 10° C./min to obtain DSC curve. The peak top temperature of the endothermic peak thereof was taken as the melting point of the base resin, and the area of the endothermic peak was taken as the heat of fusion ΔHr of the base resin. As a measuring device, heat flux differential scanning calorimeter (DSC7020, manufactured by SII Nanotechnology Inc) was used.

In Table 1, the tensile modulus was measured as follow. The tensile modulus of linear low density polyethylene as the base resin was measured according to JIS K7161-2 (2014) as follows. First, each of the raw materials in Table 1 was formed in to a press sheet having a thickness of 4 mm by the following method. Specifically, a mold with a thickness of 4 mm was placed on a heat press heated to 200° C., and the raw material was placed in the mold, melted and thereafter pressed for 5 minutes at a pressure of 15 MPa. Then, the mold was moved to a heat press at 200° C. and the press was continued at a pressure of 15 MPa until it reached ambient temperature, thereby to produce a sheet. From the obtained sheet a 1A dumbbell-shaped test piece was punched. The test piece was subjected to conditioning for 24 hours under normal conditions and, thereafter, tested using an Autograph AGS-X universal testing machine manufactured by Shimadzu Corporation at a test speed of 1 mm/min to determine the tensile modulus thereof.

In Table 1, the MFR was measured by the method described previously. Specifically, the measurement was performed under conditions including a temperature of 190° C. and a load of 2.16 kg in accordance with JIS K7210-1 (2014).

In Examples and Comparative Examples, carbon dioxide was used as a physical blowing agent.

Examples 1 to 3 and Comparative Examples 1 to 7

Production of Resin Particles:

100 Parts by mass of linear low density polyethylene of the kind shown in Tables 2-1 and 2-2 and 0.02 parts by mass of zinc borate (Firebrake ZB Fine manufactured by Borex) as a cell control agent were fed to an extruder and melted and kneaded in an extruder to obtain a molten resin. The molten resin was extruded in the form of strands through a die, taken up while being cooled in water, and cut with a pelletizer to obtain resin particles having an average mass of 1.5 mg per particle and an L/D of 1.8 (resin particle producing step).

Production of Expanded Beads by Dispersing Medium Release Foaming Method (One Stage Expansion):

An autoclave with an inside volume of 5 L was charged with 3 L of water as a dispersion medium, into which 1 kg of the resin particles were added. Further added to the dispersion medium were 0.3 part by mass of mica (A-11 manufactured by Yamaguchi Mica Co., Ltd.) as a dispersant and 0.03 part by mass of sodium dodecylbenzenesulfonate (S-20F manufactured by Daiichi Kogyo Seiyaku Co., Ltd.) as a surfactant (dispersing step). While heating the contents in the autoclave to the expansion temperature shown in Tables 2-1 and 2-2 with stirring, carbon dioxide as a physical blowing agent was injected into the autoclave until the internal pressure of the autoclave shown in Table 2 was reached, thereby to obtain expandable resin particles (blowing agent impregnation step). After having been held at that temperature for 10 minutes (high temperature peak forming step), one end of the autoclave was opened while maintaining the autoclave inside pressure as shown in Tables 2-1 and 2-2 with pressurized carbon dioxide, to release the expandable resin particles into atmospheric pressure together with the dispersion medium to expand the expandable resin particles, thereby to obtain one stage expanded beads (expansion step). The temperature of the contents in the autoclave at the time of expansion is shown in Tables 2-1 and 2-2 as the expansion temperature.

In Examples and Comparative Examples, the bulk density of the one stage expanded beads obtained by the dispersing medium release foaming method was measured. The results are shown in Tables 2-1 and 2-2. The bulk density was measured after subjecting the expanded beads to condition adjustment by allowing the expanded beads to quiescently stand in an atmosphere at 23° C., 50% relative humidity and 1 atm for 2 days.

TABLE 2-1

| | | | Example | | | Comparative Example | |
|---|---|---|---|---|---|---|---|
| | | | 1 | 2 | 3 | 1 | 2 |
| Kind of linear low density polyethylene resin | | | LLDPE1 | LLDPE1 | LLDPE2 | LLDPE3 | LLDPE4 |
| One stage expanded beads | Production conditions | Expansion temperature [° C.] | 122.5 | 123.0 | 122.5 | 123.8 | 121.0 |
| | | Pressure within autoclave [MPa(G)] | 4.1 | 4.0 | 4.1 | 4.2 | 4.4 |
| | Physical Properties | Bulk density [kg/m³] | 66 | 71 | 93 | 77 | 47 |
| Two stage expanded beads | Production conditions | Pressure within cells [MPa(G)] | 0.59 | 0.61 | 0.54 | 0.60 | 0.38 |
| | | Vapor pressure [MPa(G)] | 0.06 | 0.05 | 0.09 | 0.07 | 0.02 |
| | | Heating time [s] | 15 | 15 | 15 | 15 | 10 |
| | Physical Properties | Bulk density [kg/m³] | 19 | 24 | 20 | 31 | 23 |
| | | Average cell diameter [μm] | 155 | 157 | 146 | 115 | 80 |
| | | Closed cell content [%] | 97 | 98 | 95 | 75 | 90 |
| | | ΔH1 [J/g] | 120 | 119 | 130 | 150 | 125 |
| | | ΔHh [J/g] | 32 | 30 | 31 | 28 | 28.9 |
| | | ΔHh/ΔH1 | 0.27 | 0.25 | 0.24 | 0.19 | 0.23 |
| | | ΔH2 [J/g] | 108 | 108 | 121 | 140 | 116 |
| | | 10 Tm − 1090 [J/g] | 106 | 106 | 118 | 131 | 150 |
| | | ΔH1 > 10 Tm − 1090 | met | met | met | met | not met |
| Evaluation | Pressure range allowing in-mold molding | | A | A | B | D | C |

TABLE 2-2

| | | | Comparative Example | | | | |
|---|---|---|---|---|---|---|---|
| | | | 3 | 4 | 5 | 6 | 7 |
| Kind of linear low density polyethylene resin | | | LLDPE5 | LLDPE6 | LLDPE7 | LLDPE8 | LLDPE9 |
| One stage expanded beads | Production conditions | Expansion temperature [° C.] | 121.0 | 124.5 | 117.5 | 123.5 | 121.5 |
| | | Pressure within autoclave [MPa(G)] | 4.0 | 4.0 | 3.9 | 3.8 | 4.0 |
| | Physical Properties | Bulk density [kg/m³] | 84 | 77 | 78 | 62 | 66 |
| Two stage expanded beads | Production conditions | Pressure within cells [MPa(G)] | 0.45 | 0.04 | 0.63 | 0.06 | 0.64 |
| | | Vapor pressure [MPa(G)] | 0.02 | 0.08 | 0.07 | 0.06 | 0.25 |
| | | Heating time [s] | 10 | 15 | 10 | 15 | 15 |
| | Physical Properties | Bulk density [kg/m³] | 23 | 26 | 21 | 23 | 21 |
| | | Average cell diameter [μm] | 123 | 93 | 105 | 230 | 107 |
| | | Closed cell content [%] | 78 | 70 | 85 | 95 | 88 |
| | | ΔH1 [J/g] | 95 | 145 | 101 | 120 | 101 |
| | | ΔHh [J/g] | 29 | 30 | 28.6 | 28.9 | 30 |
| | | ΔHh/ΔH1 | 0.31 | 0.21 | 0.28 | 0.24 | 0.30 |
| | | ΔH2 [J/g] | 100 | 140 | 92 | 104 | 76 |
| | | 10 Tm − 1090 [J/g] | 130 | 170 | 110 | 137 | 130 |
| | | ΔH1 > 10 Tm − 1090 | Not met | Not met | Not met | Not met | Not met |
| Evaluation | Pressure range allowing in-mold molding | | D | D | D | C | D |

Bulk Density of Expanded Beads:

In Tables 2-1 and 2-2, the bulk density of the expanded beads obtained by the one stage expansion was measured by the method described previously. Specifically, an arbitrary amount of expanded beads after conditioning was placed in a measuring cylinder with a volume of 1 L such that a large number of expanded beads were accommodated up to the 1 L stage so as to be in a state of natural sedimentation. The bulk density of the expanded beads was obtained by dividing the mass W1 [g] of the accommodated expanded beads by the accommodated volume V1 [L] (W2/V2) with unit conversion to [kg/m³].

Production of Expanded Beads by Pressurizing Treatment (Two Stage Expansion):

The expanded beads obtained by the above-described dispersing medium release foaming method were stored in a pressurizable closed vessel. While maintaining the vessel at 30° C., compressed air was injected thereinto to perform a pressurizing treatment so that the inside pressure of the cells of the expanded beads was increased to the values shown in Tables 2-1 and 2-2. Next, the expanded beads were taken out from the vessel and again expanded by being heated with steam having the vapor pressure shown in Tables 2-1 and 2-2 for the heating time shown in Tables 2-1 and 2-2, thereby obtaining two stage expanded beads. The two stage expanded beads obtained by the two-stage expansion were measured for their bulk density, average cell diameter, closed cell content, total heat of fusion ΔH1, heat of fusion of the high temperature peak ΔHh and heat of fusion ΔH2 of the second DSC curve. In addition, evaluation of their in-mold moldability in terms of moldable range was carried out. The results are shown in Tables 2-1 and 2-2. These measurements and evaluation were carried out after the two stage expanded beads had been quiescently stood in an atmosphere at 23° C., 50% relative humidity and 1 atm for 2 days to condition the expanded beads. Further, from the value of the melting point Tm shown in Table 1 and the value of ΔH1 shown in Tables 2-1 and 2-2, whether or not the following relationship:

$$\Delta H1 > 10 \times Tm - 1090$$

were met was determined. The results are also shown in Tables 2-1 and 2-2.

In Tables 2-1 and 2-2, the bulk density of the expanded beads obtained by two stage expansion was measured in the same way as that for the one stage expanded beads. The closed cell content, total heat of fusion (ΔH1), heat of fusion of the high temperature peak (ΔHh), and heat of fusion (ΔH2) in the second time DSC of the two stage expanded beads were measured by the following methods.

Average Cell Diameter:

One expanded bead was approximately bisected. The obtained cross-section was enlargedly photographed with a microscope such that the entire cross-section magnified was included. On the obtained photograph a straight line was drawn such that the area of the cross-section was approximately bisected. A value obtained by dividing a length of a line segment thereof from the periphery of the expanded bead to the opposite periphery thereof by a number of all cells intersecting with the line segment was defined as the average cell diameter of the expanded bead. The above operation was performed on randomly selected 20 expanded beads, and the value obtained by arithmetically averaging the average cell diameters of the 20 expanded beads was defined as the average cell diameter of the expanded beads.

Closed Cell Content:

The closed cell content of the expanded beads was measured by the method described previously. The expanded beads were allowed to stand for 2 days for aging in a thermostatic chamber at 23° C. under atmospheric pressure and a relative humidity of 50%. In the same thermostatic chamber, the expanded beads thus aged as a measuring sample were measured for the precise apparent volume Va by a water immersion method described below. The measuring sample whose apparent volume Va had been measured were fully dried and measured for their true volume Vx according to Procedure C of ASTM D-2856-70 using Air Comparison Pycnometer model-930 manufactured by Toshiba Beckman Inc. From the volumes Va and Vx, the closed cell content was calculated by the formula shown below. The above measurement was performed using five measuring samples, and the arithmetic mean value thereof was defined as the closed cell content of the expanded beads.

$$\text{Closed cell content (\%)}=(Vx-W/\rho)\times 100/(Va-W/\rho)$$

wherein

- Vx represents the true volume of the expanded beads measured by the above method, which corresponds to a sum of a volume of the resin constituting the expanded beads and a total volume ($cm^3$) of all the closed cells in the expanded beads,
- Va represents an apparent volume ($cm^3$) of the expanded beads, which is measured from a rise of the water level when the expanded beads are immersed in water contained in a measuring cylinder,
- W is a weight (g) of the measuring sample used for the measurement; and
- ρ is a density ($g/cm^3$) of the resin constituting the expanded beads.

Heat of Fusion of High Temperature Peak ΔHh and Total Heat of Fusion ΔH1:

The heat of fusion of the high temperature peak ΔHh and total heat of fusion ΔH1 of the expanded beads were measured by heat flux differential scanning calorimetry (DSC) in accordance with JIS K7121(1987) using about 2 mg of expanded beads as a test sample. Specifically, the expanded beads sample was heated from 30° C. to 200° C. at a heating rate of 10° C./min to obtain a first time DSC curve. In the first time DSC curve, a sum of the area of the melting peak (intrinsic peak) intrinsic to the linear low density polyethylene and the area of one or more melting peaks (high temperature peak) that appear on the higher temperature side than the intrinsic peak was defined as the total heat of fusion ΔH1 of the expanded beads. Also, the area of the high temperature peak was defined as the heat of fusion of the high temperature peak ΔHh. As a measuring device, a heat flux differential scanning calorimeter (manufactured by SII Nanotechnology Inc, model number: DSC7020) was used.

Heat of Fusion ΔH2 of Second Time DSC Curve:

The expanded bead sample, which had been heated to 200° C. at the time the first time DSC curve was obtained, was then cooled to 30° C. at a cooling rate of 10° C./min and then again heated from 30° C. to 200° C. at a heating rate of 10° C./min to obtain a second time DSC curve. The area of the endothermic peak in the second time DSC curve was defined as the heat of fusion ΔH2 of the resin.

Evaluation of Moldable Range:

The expanded beads obtained in Examples and Comparative Examples were subjected to in-mold molding at molding pressures changed by 0.01 MPa between 0.08 and 0.15 [MPa(G): gauge pressure] (namely, at a total of eight molding pressures) in accordance with hereinafter described method of "in-mold molding at molding pressures changed by 0.01 MPa". The obtained molded articles were each subjected to 5-stage evaluation with respect to hereinafter described three items of secondary expandability, fusion bondability and recoverability. The results of the evaluation are shown in Tables 3-1 and 3-2. A molded article showing the best stage 5 in all the three evaluation items was judged to be an acceptable product. Based on the determination results, the moldable range of the expanded beads was evaluated according to the criteria shown below. The results are shown in Tables 2-1 and 2-2. By examining the moldable range, the in-mold moldability of the expanded beads may be evaluated.

A: There are 3 or more molding pressures capable of molding an acceptable product B: There are 2 molding pressures capable of molding an acceptable product C: There is 1 molding pressure capable of molding an acceptable product D: An acceptable product is not molded in any molding pressure

TABLE 3-1

| Molding pressure (MPaG) | Evaluation item | Example 1 | Example 2 | Example 3 | Comparative Example 1 | Comparative Example 2 |
|---|---|---|---|---|---|---|
| 0.08 | Expandability | — | — | — | — | — |
| | Fusion bondability | — | — | — | — | — |
| | Recoverability | — | — | — | — | — |
| 0.09 | Expandability | 4 | 3 | — | — | 1 |
| | Fusion bondability | 1 | 1 | — | — | 3 |
| | Recoverability | 5 | 5 | — | — | 5 |

TABLE 3-1-continued

| Molding pressure (MPaG) | Evaluation item | Example 1 | Example 2 | Example 3 | Comparative Example 1 | Comparative Example 2 |
|---|---|---|---|---|---|---|
| 0.10 | Expandability | 4 | 5 | — | — | 3 |
| | Fusion bondability | 2 | 5 | — | — | 5 |
| | Recoverability | 5 | 5 | — | — | 5 |
| 0.11 | Expandability | 5 | 5 | — | — | 5 |
| | Fusion bondability | 5 | 5 | — | — | 5 |
| | Recoverability | 5 | 5 | — | — | 5 |
| 0.12 | Expandability | 5 | 5 | 3 | — | — |
| | Fusion bondability | 5 | 5 | 4 | — | — |
| | Recoverability | 5 | 5 | 5 | — | — |
| 0.13 | Expandability | 5 | 5 | 5 | 5 | — |
| | Fusion bondability | 5 | 5 | 5 | 4 | — |
| | Recoverability | 5 | 4 | 5 | 4 | — |
| 0.14 | Expandability | — | — | 5 | 5 | — |
| | Fusion bondability | — | — | 5 | 5 | — |
| | Recoverability | — | — | 5 | 4 | — |
| 0.15 | Expandability | — | — | 5 | 5 | — |
| | Fusion bondability | — | — | 5 | 5 | — |
| | Recoverability | — | — | 4 | 3 | — |
| Moldable range | | 0.11-0.13 | 0.10-0.12 | 0.13-0.14 | — | 0.11 |

TABLE 3-2

| Molding pressure (MPaG) | Evaluation item | Comparative Example 3 | Comparative Example 4 | Comparative Example 3 | Comparative Example 6 | Comparative Example 7 |
|---|---|---|---|---|---|---|
| 0.08 | Expandability | 5 | — | 2 | — | 4 |
| | Fusion bondability | 4 | — | 1 | — | 1 |
| | Recoverability | 4 | — | 5 | — | 5 |
| 0.09 | Expandability | 5 | — | 2 | — | 4 |
| | Fusion bondability | 5 | — | 2 | — | 1 |
| | Recoverability | 3 | — | 5 | — | 5 |
| 0.10 | Expandability | 5 | — | 3 | 3 | 4 |
| | Fusion bondability | 5 | — | 4 | 4 | 1 |
| | Recoverability | 3 | — | 5 | 5 | 5 |
| 0.11 | Expandability | — | — | 4 | 5 | 5 |
| | Fusion bondability | — | — | 5 | 5 | 5 |
| | Recoverability | — | — | 5 | 5 | 4 |
| 0.12 | Expandability | — | — | 5 | 5 | 5 |
| | Fusion bondability | — | — | 5 | 5 | 2 |
| | Recoverability | — | — | 4 | 4 | 4 |
| 0.13 | Expandability | — | 4 | 5 | — | — |
| | Fusion bondability | — | 4 | 5 | — | — |
| | Recoverability | — | 5 | 3 | — | — |
| 0.14 | Expandability | — | 5 | 5 | — | — |
| | Fusion bondability | — | 5 | 5 | — | — |
| | Recoverability | — | 3 | 3 | — | — |
| 0.15 | Expandability | — | 5 | — | — | — |
| | Fusion bondability | — | 5 | — | — | — |
| | Recoverability | — | 3 | — | — | — |
| Moldable range | | — | — | — | 0.11 | — |

In-Mold Molding at Molding Pressures Changed by 0.01 MPa:

Molded articles were produced by the hereinafter described method of "production of expanded beads molded articles" at molding pressures (molding steam pressures) changed in increments of 0.01 MPa between 0.08 and 0.15 [MPa (G): gauge pressure)] as shown in Tables 3-1 and 3-2. The molded articles after release from the mold were each allowed to stand in an oven at 80° C. for 12 hours for aging. The molded articles after aging were subjected to condition adjustment by being allowed to stand under conditions of relative humidity of 50%, 23° C. and 1 atm for 24 hours. The molded articles were then evaluated on 1 to 5 stages (stage 5 being the best and stage 1 being the worst) for three evaluation items of secondary expandability (hereinafter also simply referred to as expandability), fusion bondability and recoverability. The results are shown in Tables 3-1 and 3-2. A steam pressure at which all of the three items are evaluated as being stage 5 is defined as being moldable steam pressure (steam pressure capable of molding an acceptable product). The broader the steam pressure range that enables molding, the wider is the molding heating temperature range that enables molding of acceptable products. In Tables 3-1 and 3-2, the symbol "–" means that evaluation was not performed because it was clear that acceptable products were unable to be obtained.

Secondary Expandability:

A rectangle of 100 mm×100 mm was drawn on a center part of the expanded beads molded article. Next, a diagonal line was drawn from one of the corners of this rectangle. The number of voids (namely, gaps between expanded beads) that were formed to overlap with this diagonal line and that were larger than a square with a side of 1 mm was counted. The expandability of the expanded beads molded article was evaluated in 5 stages according to the following criteria.

5: The number of voids is less than 5

4: The number of voids is 5 or more and less than 10

3: The number of voids is 10 or more and less than 15

2: The number of voids is 15 or more and less than 20

1: The number of voids is 20 or more

Fusion Bondability:

The expanded beads molded article was bent and broken in the longitudinal direction so as to be approximately bisected. The exposed fractured surfaces were visually observed, and the number of expanded beads that were peeled off at their interfaces and the number of expanded beads that were internally fractured were counted. Then, a ratio of the number of expanded beads that were internally fractured to a total number of the expanded beads that were peeled off at their interfaces and the number of the expanded beads that were internally fractured was calculated. The value of this ratio in percentage (%) was defined as a fusion bonding rate. From the obtained fusion bonding rate, the fusion bondability was evaluated in 5 stages according to the following criteria.

5: The fusion rate is 80% or more

4: The fusion rate is 60% or more and less than 80%

3: The fusion rate is 40% or more and less than 60%

2: The fusion rate is 20% or more and less than 40%

1: Fusion rate is less than 20%

Recoverability:

The presence or absence of molding sink in the expanded beads molded article, that is, the presence or absence of a state in which the center of the molded article is more depressed than the ends of the molded article was evaluated. Specifically, the thicknesses of the central portion and the four corner portions of the obtained expanded beads molded article were measured. A ratio of the thickness of the central portion to the thickest portion among the four corner portions was calculated. Based on the obtained thickness ratio, recoverability was evaluated in 5 stages according to the following criteria.

5: Thickness ratio is 99% or more

4: Thickness ratio is 98% or more and less than 99%

3: Thickness ratio is 96% or more and less than 98%

2: Thickness ratio is 90% or more and less than 96%

1: Thickness ratio is less than 90%

As can be seen from Table 3-1 and Table 3-2, in Example 1, the evaluation of all three items is stage 5 in the molding pressure range of 0.11-0.13 MPaG. In Example 2, the evaluation of all three items is stage 5 in the molding pressure range of 0.10-0.12 MPaG. In Example 3, the evaluation of all three items is stage 5 in the molding pressure range of 0.13-0.14 MPaG. That is, the expanded beads of Examples 1 to 3 are recognized to have a wide range of molding heating temperature capable of molding acceptable products. On the other hand, in Comparative Examples 2 and 6, the evaluation of all three items is stage 5 only when the molding pressure is 0.11 MPaG. That is, the expanded beads of Comparative Examples 2 and 6 have a limited range of molding heating temperature in which acceptable products can be molded. Further, in Comparative Examples 1, 3, 4, 5 and 7, there is no molding pressure at which the evaluation of all three items is stage 5 and, thus, the expanded beads of Comparative Examples 1, 3, 4, 5 and 7 fail to give an acceptable product.

Production of Expanded Bead Moldings:

The expanded beads obtained by the two stage expansion were dried at 23° C. for 24 hours, and molded in a mold to form an expanded beads molded article.

First, the expanded beads were filled into a flat plate mold having a length of 200 mm, a width of 65 mm and a thickness of 40 mm in which the amount of cracking was adjusted to 8 mm (20%) without applying internal pressure. Next, the molding die was clamped, and preheating was performed by supplying steam for 5 seconds with the drain valves on both sides of the mold open, followed by one-way heating at 0.01 MPa (G). Next, after one-way heating was performed from the opposite direction at 0.01 MPa (G), heating was performed for 8 seconds (main heating) with steam at the molding pressure [MPa (G): gauge pressure] shown in Table 4.

After completion of the main heating, the pressure was released, and after cooling with water until the pressure gauge attached to the inner surface of the mold decreased to 0.02 MPa (G), the mold was opened and the molded product was removed from the mold. The resulting molded article was aged in an oven at 60° C. for 12 hours and then slowly cooled to obtain an expanded beads molded article.

The shrinkage rate, the density of the molded article, and the 50% compressive stress were measured for the expanded beads molded article obtained, and the surface smoothness was evaluated. The results are shown in Table 4. Incidentally, the symbol "–" in Table 4 indicates that it was not possible to obtain an acceptable product (Comparative Examples 1, 3, 4, 5 and 7) and, therefore, the density of the molded article and the 50% compressive stress were not measured and the surface smoothness was not evaluated.

TABLE 4

| | | | Example | | | Comparative Example | | | | | | |
|---|---|---|---|---|---|---|---|---|---|---|---|---|
| | | | 1 | 2 | 3 | 1 | 2 | 3 | 4 | 5 | 6 | 7 |
| Molding Pressure [MPa(G)] | | | 0.11 | 0.10 | 0.13 | 0.14 | 0.11 | 0.09 | 0.14 | 0.12 | 0.11 | 0.11 |
| Physical Properties of Molded Article | Shrinkage ratio [%] | | 3.0 | 2.5 | 2.3 | 4.0 | 3.0 | 4.5 | 4.5 | 4.0 | 2.8 | 4.5 |
| | Density of Molded Article [kg/m$^3$] | | 24 | 29 | 26 | — | 27 | — | — | — | 28 | — |
| | 50% Compression Test | Density of Test Piece [g/cm$^3$] | 23 | 26 | 24 | — | 24 | — | — | — | 23.5 | — |

TABLE 4-continued

| | Example | | | Comparative Example | | | | | | |
|---|---|---|---|---|---|---|---|---|---|---|
| | 1 | 2 | 3 | 1 | 2 | 3 | 4 | 5 | 6 | 7 |
| 50% Compressive Stress [kPa] | 125 | 142 | 130 | — | 127 | — | — | — | 130 | — |
| Surface Smoothness of Molded Article | A | A | A | — | A | — | — | — | B | — |

The various measurements and evaluations in Table 4 were performed as follows.

Density of the Molded Article:

The density was obtained by dividing the weight of the obtained expanded beads molded article by the volume of the expanded beads molded article. The volume of the expanded beads molded article was determined by a water immersion method.

Shrinkage Ratio of Expanded Beads Molded Article after In-Mold Molding:

The longitudinal length of the obtained expanded beads molded article was measured, from which the shrinkage ratio of the expanded beads molded article after in-mold molding was determined according to the following formula. The shrinkage of the molded article is an index of dimensional stability.

Shrinkage ratio (%)=[200 [mm]−(longitudinal length of molded article [mm])]/200 [mm]×100

Compressive Stress at 50% Strain:

A test piece having a length of 50 mm, a width of 50 mm and a thickness of 25 mm was cut out from a central portion of the expanded beads molded article without including the skin. A 50% compressive stress was determined according to JIS K6767(1999) at a compressing rate of 10 mm/min. The apparent density of the test piece used for this measurement is shown in the table as density of the test piece. The measurement of the density of the test piece was carried out in the same manner as the measurement of the density of the expanded beads molded article except for using the test piece cut out, without including the skin, from the molded article. The 50% compressive stress is an index of the stiffness of the expanded beads molded product.

Evaluation Method of Surface Smoothness:

The obtained expanded beads molded article was visually observed to evaluate the surface smoothness according to the following criteria.

A: Almost no inter-bead gaps are observed on the surface of the expanded beads molded article and it shows a good surface condition in which unevenness caused by mold transfer, molding traces, etc. is not conspicuous.

B: Slight inter-bead gaps are observed on the surface of the expanded beads molded article, or unevenness due to mold transfer, molding traces, etc. is slightly observed.

C: Inter-bead gaps are observed on the surface of the expanded beads molded article, or unevenness due to mold transfer, molding traces, etc. is observed.

Comparative Example 1 pertains to expanded beads using as a base resin an ethylene-1-octene copolymer LLDPE3 being linear low density polyethylene. The density and melt flow rate of the base resin, and total heat of fusion (ΔH1) of expanded beads are excessively large. A good molded article was unable to be molded.

Comparative Example 2 pertains to expanded beads using as a base resin an ethylene-1-octene copolymer LLDPE4 being a linear low density polyethylene. The melt flow rate of the base resin is excessively high. The molding pressure range within which a good molded article was obtainable was narrow.

Comparative Example 3 pertains to expanded beads using as a base resin an ethylene-1-octene copolymer LLDPE5 being a linear low density polyethylene. The density of the base resin and the total heat of fusion (ΔH1) of the expanded beads are excessively small. A good molded article was unable to be molded.

Comparative Example 4 pertains to expanded beads using as a base resin an ethylene-1-octene copolymer LLDPE6 being a linear low density polyethylene. The density and melting point of the base resin are excessively high, and the total heat of fusion (ΔH1) of the expanded beads is excessively large. A good molded article was unable to be molded.

Comparative Example 5 pertains to expanded beads using as a base resin an ethylene-1-hexene (an α-olefin having 6 carbon atoms) copolymer LLDPE7 being a linear low density polyethylene. The total heat of fusion (ΔH1) of the expanded beads is excessively small. A good molded article was unable to be molded.

Comparative Example 6 pertains to expanded beads using as a base resin an ethylene-4-methylpentene-1 (an α-olefin having 6 carbon atoms) copolymer LLDPE8 being a linear low density polyethylene. The melt flow rate of the base resin is excessively high, and the molding pressure range within which a good molded article is obtainable is narrow. Furthermore, the average cell diameter of the expanded beads is large. The surface smoothness of the obtained molded article was lowered.

Comparative Example 7 pertains to expanded beads using as a base resin an ethylene-1-butene (an α-olefin having 4 carbon atoms) copolymer LLDPE9 being a linear low density polyethylene. The total heat of fusion (ΔH1) of the expanded beads is small. A good molded article was unable to be molded.

The invention claimed is:

1. Polyethylene-based resin expanded beads comprising a base resin containing non-crosslinked linear low density polyethylene, said linear low density polyethylene being a copolymer of ethylene and an α-olefin having 8 carbon atoms and having a density of 0.922 g/cm$^3$ or more and less than 0.935 g/cm$^3$ and a melt flow rate of 0.8 g/10 min or more and 1.5 g/10 min or less, said base resin having a melting point (Tm) of 115° C. or more and 125° C. or less, said expanded beads having an average cell diameter of 50 μm or more and 220 μm or less, said expanded beads having a crystal structure that shows a first time DSC curve having an intrinsic melting peak which is intrinsic to the base resin and a high temperature melting peak which is located on a higher temperature side of the intrinsic melting peak, when said expanded beads are measured by heat flux differential scanning calorimetry in which a sample thereof is heated from 30° C. to 200° C. at a heating rate of 10° C./min, wherein a total heat of fusion (ΔH1) defined as a sum of a heat of fusion (ΔHi) of the intrinsic melting peak and a heat of fusion (ΔHh) of the high temperature melting peak is 110 J/g or more and 140 J/g or less.

2. The polyethylene-based resin expanded beads according to claim 1, wherein said expanded beads show a second time DSC curve having a melting peak having a heat of fusion (ΔH2) of 105 J/g or more and 125 J/g or less, when said expanded beads are measured by heat flux differential scanning calorimetry in which a sample thereof heated to 200° C. in the measurement of the first time DSC curve is cooled from 200° C. to 30° C. at a cooling rate of 10° C./min and then heated again from 30° C. to 200° C. at a heating rate of 10° C./min.

3. The polyethylene-based resin expanded beads according to claim 1, wherein a ratio (ΔHh/ΔH1) of the heat of fusion (ΔHh) of the high temperature melting peak to the total heat of fusion (ΔH1) is 0.20 or more and 0.30 or less.

4. The polyethylene-based resin expanded beads according to claim 1, wherein the heat of fusion (ΔHh) of the high temperature melting peak is 15 J/g or more and 50 J/g or less.

5. The polyethylene-based resin expanded beads according to claim 1, wherein a relationship between the melting point (Tm) of the base resin and the total heat of fusion (ΔH1) satisfies the following formula:

$$\Delta H1 > 10 \times Tm - 1090.$$

6. The polyethylene-based resin expanded beads according to claim 1, wherein a density of the linear low density polyethylene is more than 0.925 g/cm$^3$ and less than 0.930 g/cm$^3$, and the melting point (Tm) of the base resin is 118° C. or higher and 122° C. or lower.

7. The polyethylene-based resin expanded beads according to claim 1, wherein a bulk density of the expanded beads is 10 kg/m$^3$ or more and 50 kg/m$^3$ or less.

* * * * *